United States Patent
Kelley

(10) Patent No.: US 8,234,482 B2
(45) Date of Patent: Jul. 31, 2012

(54) UNIVERSAL EMBEDDED CONTROLLER FOR FREEING CPU FROM OPERATIONS OF PERIPHERAL SUBSYSTEM UNITS WITH TABLE OF FUNCTIONS INCLUDING AN INSTRUCTION SPECIFYING BATTERY CONTROLLER SELECT PROTOCOL

(75) Inventor: Robert Kelley, Portland, OR (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 11/251,595

(22) Filed: Oct. 13, 2005

(65) Prior Publication Data

US 2007/0088933 A1 Apr. 19, 2007

(51) Int. Cl.
*G06F 15/00* (2006.01)
(52) U.S. Cl. .......................... 712/38; 710/63
(58) Field of Classification Search .................. None
See application file for complete search history.

(56) References Cited

U.S. PATENT DOCUMENTS

| | | | | |
|---|---|---|---|---|
| 5,295,059 A * | 3/1994 | Brooks et al. | 700/18 |
| 5,459,671 A * | 10/1995 | Duley | 702/63 |
| 5,905,891 A * | 5/1999 | Harada et al. | 717/146 |
| 5,960,212 A * | 9/1999 | Mak | 712/34 |
| 6,014,141 A * | 1/2000 | Klein | 715/835 |
| 6,545,448 B1 * | 4/2003 | Stanley et al. | 320/132 |
| 6,708,268 B1 * | 3/2004 | Boles et al. | 712/220 |
| 6,766,391 B2 * | 7/2004 | Kuo et al. | 710/62 |
| 6,941,451 B2 * | 9/2005 | Rudy et al. | 713/1 |
| 7,003,373 B2 * | 2/2006 | Baumann et al. | 700/189 |
| 7,047,351 B2 * | 5/2006 | Jeddeloh | 711/5 |
| 7,447,894 B2 * | 11/2008 | Oshiba et al. | 713/2 |
| 7,607,005 B1 * | 10/2009 | Lewis | 713/100 |
| 2002/0129288 A1 * | 9/2002 | Loh et al. | 713/320 |
| 2005/0114581 A1 * | 5/2005 | Azadet et al. | 710/305 |
| 2005/0171711 A1 * | 8/2005 | Tung | 702/63 |
| 2006/0238533 A1 * | 10/2006 | Chen | 345/211 |

OTHER PUBLICATIONS

"DS2438 Smart Battery Monitor"; Maxim Integrated Products; 2 pages; http://www.maxim-ic.com/quick_view2.cfm/qv_pk/2919.
Overview of 1-Wire Technology and Its use; Maxim Integrated Products; 6 pages; http://www.maxim-ic.com/appnotes.cfm/appnote_number/1796.

* cited by examiner

*Primary Examiner* — Kenneth Kim
(74) *Attorney, Agent, or Firm* — Morris & Kamlay LLP

(57) ABSTRACT

A subprocessor is used to interface between subsystems and to reduce the amount of dedicated hardware used to implement the subsystems in a hand-held computer. The subprocessor includes basic processing system resources such as random-access memory (RAM), read-only memory (ROM), a processor, input/output (I/O) facilities, etc. Selected functions in subsystems are achieved by firmware instructions executed by the subprocessor as opposed to a main processor that is also used in the computer. This approach can provide efficiencies such as low power consumption, less required space, less routing overhead, easier transfer of inter-subsystem information, and other advantages.

12 Claims, 3 Drawing Sheets

UNIVERSAL EMBEDDED CONTROLLER FOR FREEING CPU FROM OPERATIONS OF PERIPHERAL SUBSYSTEM UNITS WITH TABLE OF FUNCTIONS INCLUDING AN INSTRUCTION SPECIFYING BATTERY CONTROLLER SELECT PROTOCOL

BACKGROUND

Digital processing systems are used in many products such as computers, audio players, cameras, cell phones, etc. Each of these systems includes several or many subsystems that perform dedicated tasks or functions such as scanning for user input, maintaining a communication link, managing power consumption, controlling indicator lights, handling display of images on a display screen, etc. By designing each subsystem for a specific task, a complex device that performs many functions can be divided into its smaller functions and one or more smaller functions can be implemented as a subsystem, thus simplifying the design process.

If dedicated hardware is provided for the subsystems then less centralized control and resources are needed to achieve the functions of the subsystem. For example, if a keyboard key scanner is implemented in hardware where shift registers are used to poll rows and columns of a keyboard grid then such a task will not take up any of the main processor's cycles, memory or other resources. The key scanning subsystem can simply provide a keycode to a routine executed by the main processor whenever a keypress is detected. Such provision to the routine can be, for example, by an interrupt signal while the main processor is performing other tasks.

Although the approach of using dedicated hardware to implement various subsystem functions can provide advantages, some drawbacks of this approach become more pronounced as devices become smaller. For example, in very small devices such as hand-held or other ultra-portable computer systems the amount of space within the device is extremely limited. Subsystems that use dedicated hardware take up space for their electronic components. An even more serious space issue may be in routing signals among the electronic components such as between subsystem hardware or between a subsystem and a main controller that must communicate with the subsystem.

Yet other considerations such as heat dissipation, power consumption, data bandwidth, inter-subsystem communication, etc., can adversely impact a design that uses dedicated hardware for subsystems, especially when the subsystems are designed for small devices.

SUMMARY OF EMBODIMENTS OF THE INVENTION

A preferred embodiment of the invention uses a subprocessor to reduce the amount of dedicated hardware used to implement subsystems in a hand-held computer. The subprocessor includes basic processing system resources such as random-access memory (RAM), read-only memory (ROM), a processor, input/output (I/O) facilities, etc. Selected functions in subsystems are achieved by firmware instructions executed by the subprocessor as opposed to a main processor that is also used in the computer. This approach can provide efficiencies such as low power consumption, less required space, less routing overhead, easier transfer of inter-subsystem information, and other advantages.

In a preferred embodiment, a table-driven approach to firmware processes is used to reduce the size of the firmware code. A minimal set of instructions and attributes is used so that functions for subsystems can be achieved in a compact and flexible description. An example of a type of subsystem in which this approach is used is a battery subsystem for indicating battery conditions such as drain and charge rate, current capacity, etc. Inter-subsystem communication includes exchanging sensing subsystems with indicator subsystems. For example, accelerometers can be used to detect movement of a hand-held device so that a cursor indicator can be moved according to the device's movement. Keyboard keys can be used to control power parameters, assign audible or visible indicators to conditions, provide instant access to pop-up menus, etc.

In one embodiment the invention provides an apparatus for interfacing between first and second subsystems in a processing system, the apparatus comprising: a main processor; a subprocessor for executing instructions; persistent memory directly coupled to the subprocessor and not to the main processor, the persistent memory including instructions for execution by the subprocessor; a first interface for communicating between the subprocessor and the first subsystem; a second interface for communicating between the subprocessor and the second subsystem; and one or more instructions for exchanging information between the first and second subsystems.

DETAILED DESCRIPTION OF THE INVENTION

Figure 1:
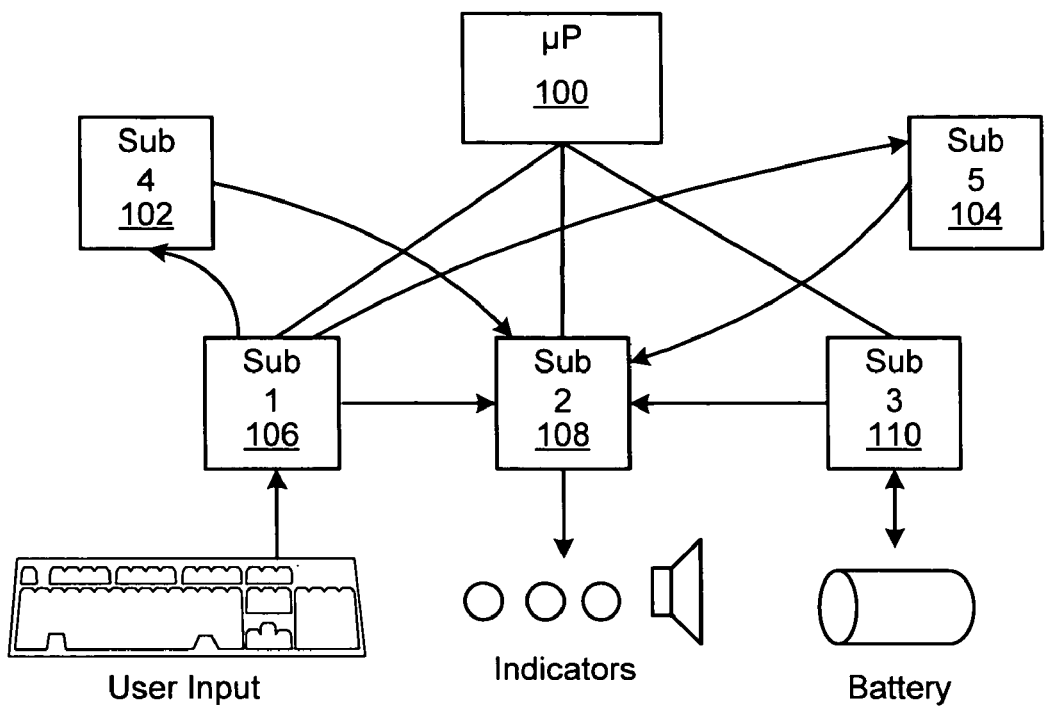
FIG. 1 illustrates a prior art approach to subsystem interfacing.

FIG. 1 illustrates a prior art approach to subsystem interfacing, such as in a portable processing device or hand-held computer. Although embodiments of the invention may be described primarily with respect to such portable computing devices, features of the invention may be used in any other type of device, circuit, process or combination thereof.

In FIG. 1, main processor 100 is connected to subsystems such as keyboard subsystem 106, indicator subsystem 108 and battery subsystem 110. Each subsystem is shown connected to its corresponding target. Any number of additional subsystems can be used and interconnected as desired such as shown by subsystems 102 and 104. In this design, subsystem blocks such as 102, 104, 106, 108 and 110 include dedicated hardware for performing specific functions relevant to each subsystem. For example, keyboard subsystem 106 includes hardware for scanning the keyboard, debouncing keys, generating keycodes to be read by the main processor, etc. Indicator subsystem 108 includes hardware to turn on and off lights, output voltages or waveforms to a speaker, change the intensity or color of the lights, etc. Battery subsystem 110 includes hardware for measuring battery charge and charge rate, controlling charge and power drain, etc.

In the design of FIG. 1, the keyboard subsystem also communicates directly with other subsystems such as the indicator subsystem. This may be useful, for example, to have a light go on when a SHIFT key is pressed, to sound a beep when a combination of function keys are depressed, or for other functions. By allowing a direct connection between subsystems there is no need for main processor 100 to take action in order to achieve the functions. Thus, main processor cycles can be saved for other tasks such as for executing user applications. Similarly, battery subsystem 110 can interface directly with indicator subsystem 108 to turn on a light directly when the battery is receiving power from a wall power outlet connection, when the battery energy is low, etc.

Figure 2:
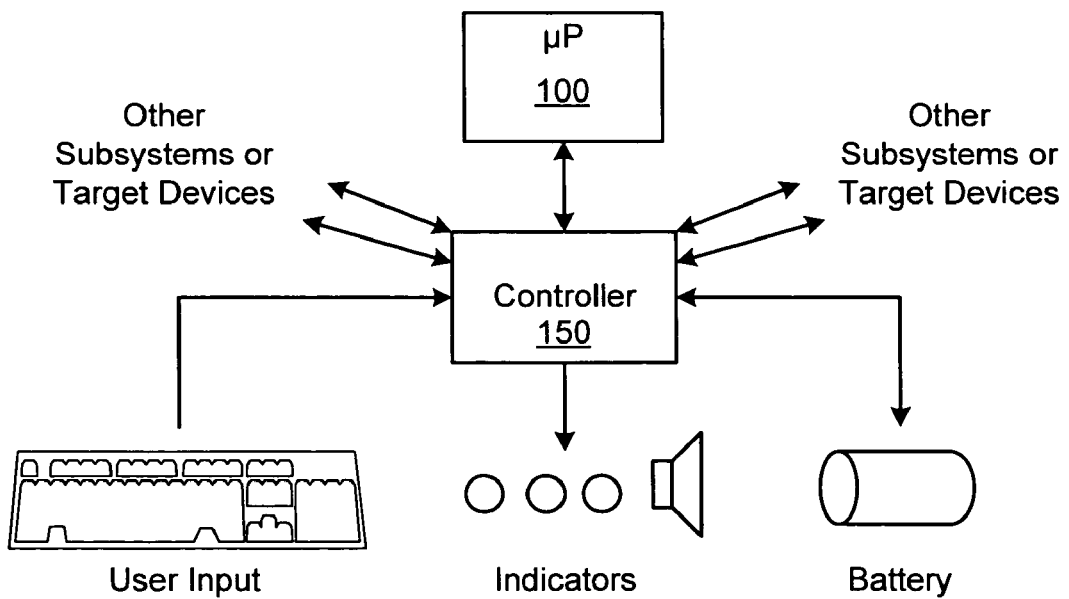
FIG. 2 shows subsystem interfacing according to a preferred embodiment of the present invention.

FIG. 2 shows subsystem interfacing according to a preferred embodiment of the present invention. In FIG. 2, the subsystem hardware blocks of FIG. 1 are gone, thus indicating that much, or all, of the dedicated hardware can be omitted from the design. Instead, target component signals, such as from the keyboard, indicators, battery, etc., are connected directly to subprocessor 150 which communicates with main processor 100. Any number of target components can be enabled in this manner. As described below, the basic functions performed by the subsystem hardware are performed by subprocessor 150. Any communication or interface among the target components can also be performed by subprocessor 150 without the need for routing physical traces on a space-limited substrate or circuit board. Note that in some designs it may be desirable to have hardware subsystem circuitry to a desired degree. Such an approach can be used in concert with the subprocessor approach.

The subprocessor provides the ability to route any arbitrary input from a target component to any arbitrary output to a target component. The routing can be done by changing executable instructions, thus avoiding dedicated components and other hardware. This approach can provide other advantages such as obviating the need to change software running on the host, or main, processor. To the extent that functionality can be modified by changing the code at the controller within the subprocessor, version updates to the main processor's code are not necessary. Substantial portions of the architecture of the device can be downloadable via communication links such as the internet. Thus, users may upgrade essential 'hardware-like' features in their computer without changing any physical features purely through internet download. Features such as are shown in Table I, below, can be loaded into a device.

Another advantage is that the transformation of a large number of board components from hardware to software allows the resulting firmware implementation of the subsystems' functions to be encrypted. This reduces the ability of others to copy our design and makes manufacture of devices more secure.

Figure 3:
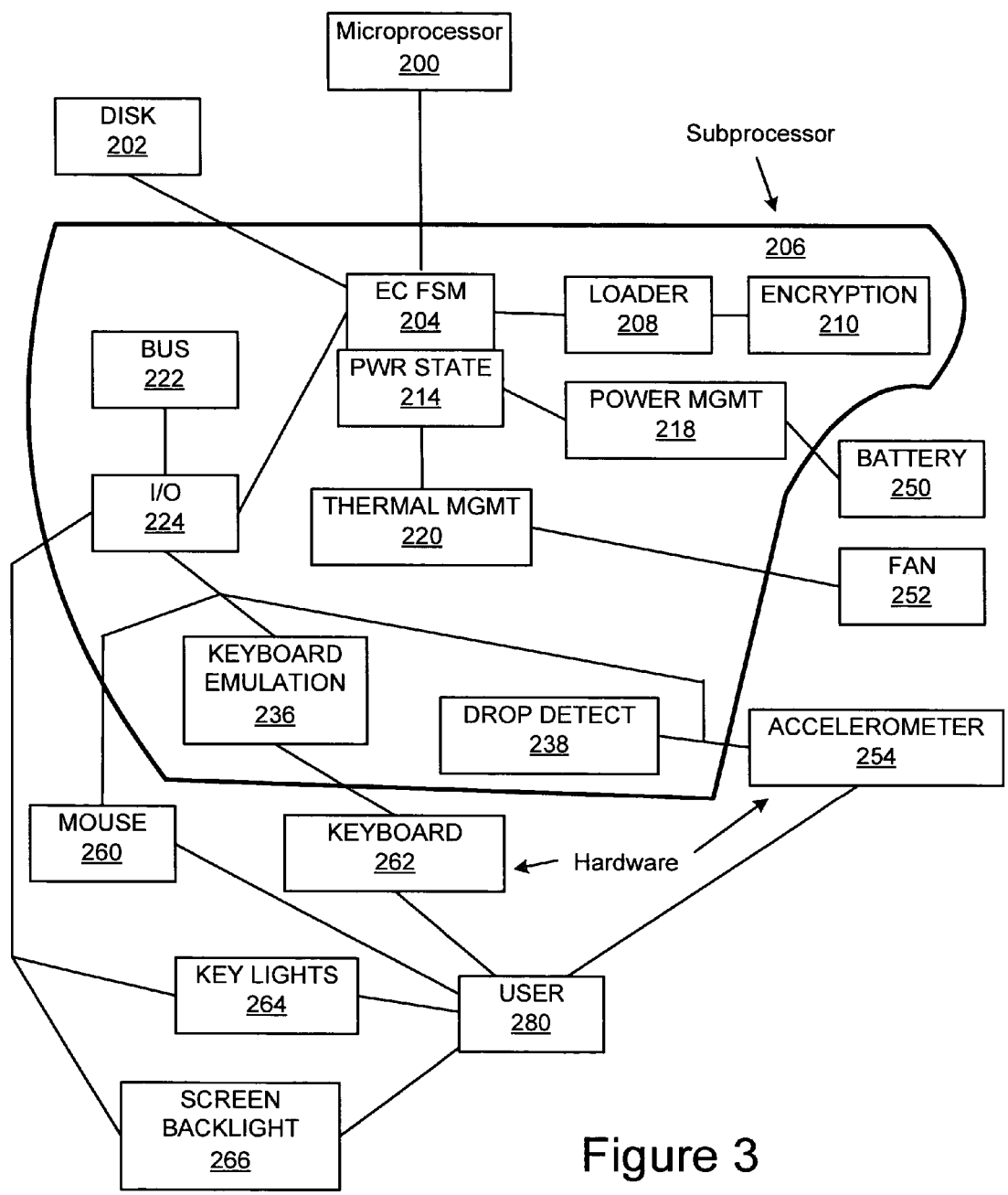
FIG. 3 shows an expanded block diagram corresponding to the basic design approach of FIG. 2.

FIG. 3 shows an expanded block diagram corresponding to the basic design approach of FIG. 2. In FIG. 3, microprocessor 200 performs the role of main processor 100 in FIGS. 1 and 2. Subprocessor 206 performs interface controller functions among different subsystems such as battery 250, fan 252, accelerometers 254, keyboard 262, mouse 260, key lights 264 and screen backlight 266. Subprocessor 206 includes embedded controller 204 for executing instructions to achieve functionality such as sending control signals to the subsystems and receiving sensor signals from the subsystems. Loader 208 and encryption module 210 are used to load firmware instructions into persistent memory (e.g., flash ROM, battery backed-up RAM, magnetic media, etc.) to provide executable instructions to the controller. The controller is also provided with standard processor features such as bus 222, power state register 214 for sensing and controlling power management module 218 and thermal management module 220.

Controller 206 is also connected to additional I/O capability via I/O controller 224 which can provide interfacing to subsystems such as keyboard emulator 236, drop detector 238 or direct connections to target components such as key lights 264 and screen backlight 266.

User 280 interacts with various user controls and indicators such as the key lights, screen, keyboard, mouse, accelerometer, etc. In other designs any number and type of modules, components, subsystems or other items can be used that deviate from those shown in FIG. 3. components can be grouped into three types of categories as output, (keylights, screen backlight control, fan, powercontrol) input (keyboard, mouse/trackstick, scrollwheel, accelerometer, photosensor, thermometers, voltmeters, dock ID) and internal (clocks, queue, embedded controller finite state machine—ECFSM).

As used in this specification, "subsystem" includes any target component such as a keyboard, indicator, battery, display screen, accelerometer, position sensor, printer, scanner, network interface, I/O communication, or any other device, resource, component, process or other item. A subsystem can include any number of such items whether the items are in proximity to a user, main processor or other part of a subject device. A subsystem can also include dedicated hardware, software or combination thereof for communicating with a target component.

By using the approach of FIG. 3, much of the physical wire or trace routing between subsystems can be eliminated or reduced. It is possible for any of the items in FIG. 3 to have information exchanged among them by transferring the information via controller 206. Thus, no direct connection (i.e., hardwired trace) between subsystems is necessary. For example, if it is desired that a keypress or combination of keypresses activate or affect another subsystem this can be achieved by changing the instructions in the controller. Instructions can be in RAM in addition to flash ROM so that the way that the keyboard controls the indicators, for example, can be changed by the user at the time of operation of the device as opposed to being set by a manufacturer or software developer and loaded into the controller when the device is not executing user applications.

Using the embedded controller and subprocessor approach to perform functions of even a few different components can greatly reduce the signal routing layout issues. If we have N components on a board, we are restricted by the number of unobstructed paths between those N components. As N increases in number the number of potential connections grows as $N^2$. Thus, the proportion of the devices which can be directly connected becomes smaller as N increases, when N grows large, the number of subsystem components that are reduced becomes proportionately less. One design methodology is to examine the tradeoff between functionality performance and resource use. For example, a resource use can include physical space on a board or chip, power consumption, communication bandwidth, etc. As the number of subsystem functions put into a subprocessor system increases, the available resource use can decrease, such as where the amount of available space increases. However, the speed or other performance criteria of the functions may decrease. One design approach is to place the maximum number of subsystem functions in the subprocessor as long as function performance does not fall below a design goal (e.g., threshold latency, data capacity, power consumption, etc.). Another approach is to put as many of the functions as possible into the subprocessor until the maximum capacity of the subprocessor (usually dictated by I/O connections or controller resources such as processor cycles, memory, etc.) is reached.

Once the subcomponents are done away with, then all components can, in theory, be directly connected with little or no design difficulty. While it is not necessary or practical to connect all components with all others, some advantages of a topologically unrestricted design process can be achieved such that the physical location of many components becomes unimportant.

Some advantages realized with this approach include making more space available for remaining subsystem components while preserving the overall functions of the system, tighter packing of existing components due to elimination of components, associated traces and reduced thermal output.

Power management functions can be provided to the user in a more flexible manner. Rather than just having a single indicator to show low power, a mode can be activated (e.g., by user selection, depending upon the model of device, etc.) so that more detailed battery information is provided such as using multiple indicators to show the health or life of the battery, enable rapid charging, etc. In addition due to the direct connection between keyboard and power management the user may interact with the power in cases where the operating system is unresponsive without resorting to a hardware switch.

One function provided in a preferred embodiment is to use the controller to receive accelerometer signals depending on how the device is tilted. A pointer is moved on the display in accordance with the degree and direction of tilt. In this manner the user can manipulate the pointer to select objects on the screen. Table I, below, shows an example list of functions that can benefit from subsystem interconnection via a controller.

TABLE I drop detection real-time calculations
system power supply sequencing
processor-state I2C-bus diagnostic interpreter
BIOS flash programming security
headset recognition and mode switching
power-supply quality monitoring and system shutdown if outside limits
mouse buttons from keyboard interleaved into trackstick traffic
scroll wheel interface; data interleaved into trackstick traffic
trackstick data interface
PCI peripheral clock control
southbridge reset at power on TABLE I-continued power button logical interface
dock detection, identification and ACPI dock-undock notification
power button LED brightness undulation
LED control for sticky keys
trackstick hardware power management
keyboard position sensor interface
ACPI event notification including ACPI BIOS interface
LCD backlight power control
fan speed control including ACPI BIOS interface
system diagnostic port (serial)
display rotation UI and hardware control
ambient-light sensor interface
CPU thermal sensor
MLB thermal sensor
real-time clock
battery interface
keyboard controller
misc glue logic The functions in Table I are included in products manufactured by OQO as, for example, the OQO-01 product. In a preferred embodiment, the subprocessor includes an embedded controller that is a semiconductor chip manufactured by National Corp. as part PC87591 E-VLD. In other embodiments any suitable type of controller can be used and need not be a complete microprocessor system.

Figure 4:
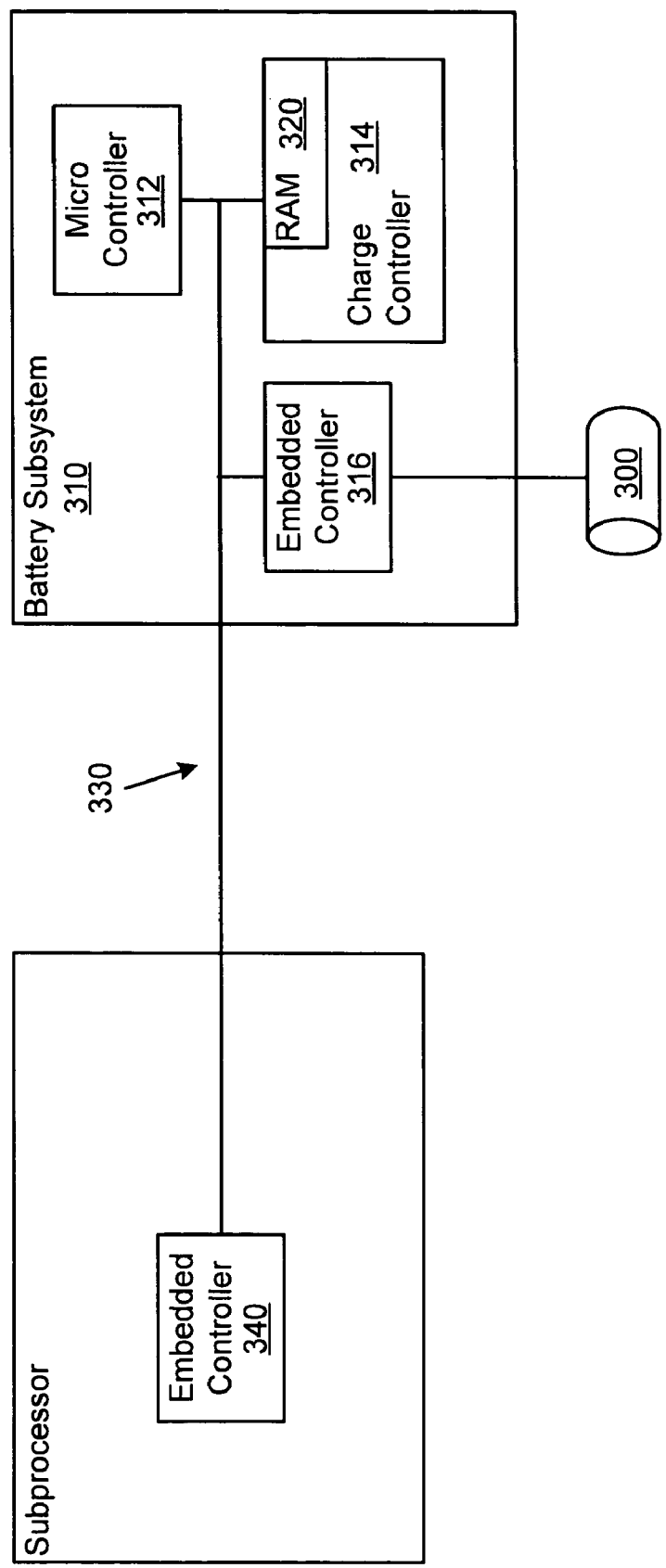
FIG. 4 shows more details of a feature whereby the subprocessor obtains battery status information by using resources internal to a battery controller.

FIG. 4 shows more details of a feature whereby the subprocessor obtains battery status information by using resources internal to a battery controller and by using a 1 line bus. In FIG. 4, battery monitor 310 includes its own microcontroller 312, charge controller 320 and protection controller 316. Microcontroller 312 can be interrogated by subprocessor 340 so that the subprocessor can obtain information about battery 300. In a preferred embodiment, the battery controller, bus and communication protocol are according to products manufactured by Dallas Semiconductor in their "1 Wire™" product line. For example, in a preferred embodiment the battery controller is part DS2770. In other embodiments, other parts, communication links and protocols can be used. In some operations it is desired to obtain information over bus 330 faster than microcontroller 312 can provide the information. Rather than have the subprocessor standby with idle cycles to handle a longer and more frequent communications, the desired information is stored into RAM area 320 within charge controller 320. This allows faster reading of the data when requested by subprocessor 340. About 20 bytes are available for such use in the charge controller's RAM.

Another aspect of the design of a subprocessor in a preferred embodiment is to use table-driven implementations of functions in the controller. Table II shows an example of table-driven instructions. Each instruction has an instruction identifier on the left column and associated attributes in the right column.

TABLE II

| | | |
|---|---|---|
| | ... | |
| 1 | Select Battery Controller | {attributes: 64 bits to implement selection protocol} |
| 2 | Select RAM Read | |
| 3 | Read Values | {destination} |
| 4 | Select Indicators | {attributes} |
| 5 | Write Value | {value} |
| | ... | |

For example, instruction 1 is used to select the battery controller for communication. Instruction 2 indicates a RAM read operation of the RAM within the charge controller as described above. Instruction 3 reads the values from the charge controller's RAM. Instruction 4 selects the indicators, such as key lights 264 of FIG. 3. Instruction 5 writes a value to a register in the I/O controller 224 to control the indicator lights. Table III, below, shows actual code to accomplish the basic steps 1, 2 and 3 of Table II.

TABLE III

```
const u08 readEverythingCode[ ] =
{
    /* read interesting registers of the DS2720 */
    RESET, IBYTE, 0xf0, IBIT, 1, IBIT, 1, IBIT, 1,
    ADDRESS,
        IBYTE, 0x69, IBYTE, 0x00,
        READ, offsetof(OWData, ds2720protection), 2,
```

TABLE III-continued

```
        SKIP, 5,
        READ, offsetof(OWData, ds2720eepreg), 2,
        /* read interesting registers of the DS2770 */
        RESET, IBYTE, 0xf0, IBIT, 1, IBIT, 1, IBIT, 0,
    ADDRESS,
        IBYTE, 0x69, IBYTE, 0x01,
        READ, offsetof(OWData, ds2770status), 3,
        SKIP, 2,
        READ, offsetof(OWData, ds2770chargeTime), 2,
        SKIP, 4,
        READ, offsetof(OWData, ds2770voltageMSB), 6,
        SKIP, 6,
        READ, offsetof(OWData, ds2770temperatureMSB), 2,
        /* read SRAM of the DS2770 */
        RESET, IBYTE, 0xf0, IBIT, 1, IBIT, 1, IBIT, 0,
    ADDRESS,
        IBYTE, 0x69, IBYTE, 0x80,
        READ, offsetof(OWData,
    ds2770lastFullChargeCapacityMSB), 6,
        STOP
    };
```

Although specific embodiments of the invention have been described, variations of such embodiments are possible and are within the scope of the invention. For example, although specific protocols may be used to describe embodiments herein, other embodiments can use other transmission protocols or standards. Use of the terms 'peer', 'client', and 'server' can include any type of device, operation, or other process. The invention can operate among any one or more processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the functionality of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments unless otherwise specified. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. The functions may be performed in hardware, software or a combination of both.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. Functions and parts of functions described herein can be achieved by devices in different places and operating at different times. For example, a processor can perform its functions in "real time," "offline," in a "batch mode," etc. Parallel, distributed or other processing approaches can be used.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

Thus, the scope of the invention is to be determined solely by the appended claims.

The invention claimed is:

1. An apparatus for interfacing between subsystems within a portable computer, the apparatus comprising, within the portable computer:
   a main processor;
   an embedded controller for executing instructions;
   a first subsystem comprising a plurality of components, each of the plurality of components selected from a group consisting of: an accelerometer, a keyboard controller, a mouse controller, and a battery level indicator;
   a second subsystem comprising a plurality of components, each of the plurality of components selected from a group consisting of: a battery charging circuit, a keyboard light controller, a display backlight controller, and a display controller,
   wherein the embedded controller directly receives a first signal from the first subsystem, the signal being generated by a sensor that comprises at least one of a keyboard, a mouse, the accelerometer and the battery level indicator, and directly transfers a second signal derived from the first signal to the second subsystem to control a corresponding one of keyboard lights, display backlight, and pointer coupled to the second subsystem, wherein the second signal is not transferred to the main processor; and
   persistent memory directly coupled to the embedded controller and not to the main processor, the persistent memory including a table of functions for execution by the embedded controller for executing instructions in a function in response to the first signal from the first subsystem to generate the second signal to the second subsystem based upon the first signal, the table of functions further storing an instruction to select a battery controller and protocol information for communication with the battery controller, the instruction causing the embedded controller to select the battery controller for communication.

2. The apparatus of claim 1, wherein a subsystem includes a user input control.

3. The apparatus of claim 2, wherein a user input control includes a keyboard.

4. The apparatus of claim 2, wherein a user input control includes a pointer control.

5. The apparatus of claim 1, wherein a subsystem includes power management.

6. The apparatus of claim 1, wherein a subsystem includes audible indicators.

7. The apparatus of claim 1, wherein a subsystem includes visual indicators.

8. The apparatus of claim 1, further comprising:
   one or more instructions stored in the persistent memory for reading instructions from the table, wherein each instruction has an attribute; and
   one or more instructions stored in the persistent memory for using the instructions in the table to perform communication between two subsystems.

9. The apparatus of claim 8, wherein the first subsystem includes a battery status subsystem and wherein the second subsystem includes an indication subsystem, the apparatus further comprising:
   one or more instructions stored in the persistent memory for obtaining battery status information from the battery status subsystem; and
   one or more instructions stored in the persistent memory for transferring the battery status information to the indication subsystem.

10. The apparatus of claim 9, wherein battery status information is stored in a memory location within the battery status subsystem.

11. The apparatus of claim 1, wherein the table of instructions includes an instruction identifier on the left column and associated attributes in the right column.

12. The apparatus of claim 11, wherein a first column of the table includes an instruction to select indicators and wherein a second column of the table includes attributes for the instruction to select indicators.

* * * * *